(12) United States Patent
Lin et al.

(10) Patent No.: US 10,135,623 B2
(45) Date of Patent: Nov. 20, 2018

(54) METHOD AND SYSTEM FOR CHECKING REVOCATION STATUS OF DIGITAL CERTIFICATES IN A VIRTUALIZATION ENVIRONMENT

(71) Applicants: INSTITUTE OF INFORMATION ENGINEERING, CHINESE ACADEMY OF SCIENCES, Beijing (CN); DATA ASSURANCE & COMMUNICATION SECURITY CENTER, CHINESE ACADEMY OF SCIENCES, Beijing (CN)

(72) Inventors: Jingqiang Lin, Beijing (CN); Bingyu Li, Beijing (CN); Zhan Wang, Beijing (CN); Jiwu Jing, Beijing (CN); Congwu Li, Beijing (CN); Luning Xia, Beijing (CN); Qiongqiao Wang, Beijing (CN)

(73) Assignee: Institute of Information Engineering, Data Assurance & Communication Security Center, Chinese Academy of Sciences, Beijing (CN)

( * ) Notice: Subject to any disclaimer, the term of this patent is extended or adjusted under 35 U.S.C. 154(b) by 0 days.

(21) Appl. No.: 15/118,763

(22) PCT Filed: Jul. 15, 2015

(86) PCT No.: PCT/CN2015/084033
§ 371 (c)(1),
(2) Date: Aug. 12, 2016

(87) PCT Pub. No.: WO2016/201754
PCT Pub. Date: Dec. 22, 2016

(65) Prior Publication Data
US 2018/0102904 A1 Apr. 12, 2018

(30) Foreign Application Priority Data

Jun. 15, 2015 (CN) .................. 2015 1 03288994

(51) Int. Cl.
*H04L 9/08* (2006.01)
*H04L 9/30* (2006.01)
(Continued)

(52) U.S. Cl.
CPC ........ *H04L 9/3268* (2013.01); *G06F 9/45545* (2013.01); *G06F 9/45558* (2013.01);
(Continued)

(58) Field of Classification Search
CPC ... H04L 29/06; H04L 9/0891; G06F 9/45545; G06F 9/45558
See application file for complete search history.

(56) References Cited

U.S. PATENT DOCUMENTS 7,571,312 B2 * 8/2009 Scarlata ................. G06F 21/53
713/155
8,074,262 B2 * 12/2011 Scarlata ................. G06F 21/53
726/4
(Continued)

OTHER PUBLICATIONS https://www.vmware.com/content/dam/digitalmarketing/vmware/en/pdf/whitepaper/solutions/vmware-view-ocsp-crl-technical-whitepaper.pdf 2010 (Babu).*

*Primary Examiner* — Sharon S Lynch
(74) *Attorney, Agent, or Firm* — SV Patent Service

(57) ABSTRACT

The present invention discloses a method and a system for checking revocation status of digital certificates in a virtualization environment. The method includes: 1) Setting up multiple virtual machines in a host computer; setting up a certificate revocation list manager within the virtual machine monitor of the host computer; 2) The certificates relying party in the virtual machines sends a service request for
(Continued)

checking certificate revocation status to the certificate revocation list manager; 3) The certificate revocation list manager searches locally for the CRL file corresponding to the service request for checking certificate revocation status: a) If such a corresponding CRL file exists, the CRL file is returned to the certificate relying party in the virtual machines; or, the certificate revocation list manager checks whether the corresponding certificate serial number exists in the CRL file, then returns the result; b) if the corresponding CRL file does not exist, the corresponding CRL file is downloaded and verified according to the configuration file; then the CRL file is returned to the certificate relying party in the virtual machines; or, the certificate revocation list manager checks whether the corresponding certificate serial number exists in the CRL file, then returns the result. The present invention greatly improves the efficiency of checking revocation status of certificates.

10 Claims, 2 Drawing Sheets

(51) Int. Cl.
    *H04L 9/32*            (2006.01)
    *G06F 21/33*          (2013.01)
    *G06F 9/455*          (2018.01)
    *H04L 29/06*          (2006.01)
    *H04L 9/00*            (2006.01)
(52) U.S. Cl.
    CPC .............. *G06F 21/33* (2013.01); *H04L 9/006* (2013.01); *H04L 9/0891* (2013.01); *H04L 63/0823* (2013.01); *G06F 2009/45583* (2013.01); *H04L 9/30* (2013.01)

(56) References Cited

U.S. PATENT DOCUMENTS

| | | | | |
|---|---|---|---|---|
| 8,677,449 B1* | 3/2014 | Beda, III | ............ | G06F 21/6218 726/1 |
| 9,432,356 B1* | 8/2016 | Johansson | ........... | H04L 63/0823 |
| 2002/0004773 A1* | 1/2002 | Xu | .................. | G06Q 40/06 705/36 R |
| 2002/0178355 A1* | 11/2002 | D'Sa | ................... | H04L 63/0272 713/156 |
| 2002/0178361 A1* | 11/2002 | Genty | ................ | G06Q 20/0855 713/175 |
| 2004/0093493 A1* | 5/2004 | Bisbee | .................. | G06Q 20/00 713/156 |
| 2006/0256108 A1* | 11/2006 | Scaralata | ................ | G06F 21/57 345/418 |
| 2007/0156860 A1* | 7/2007 | Nedelcu | .................. | H04L 41/12 709/220 |
| 2008/0320594 A1* | 12/2008 | Jiang | ..................... | G06F 21/566 726/24 |
| 2009/0144510 A1* | 6/2009 | Wibling | ............... | G06F 9/5016 711/147 |
| 2010/0024016 A1* | 1/2010 | Violleau | ............... | G06F 21/335 726/7 |
| 2010/0325429 A1* | 12/2010 | Saha | ................... | H04L 63/0823 713/158 |
| 2011/0219447 A1* | 9/2011 | Horovitz | ............ | G06F 9/45533 726/22 |
| 2011/0258435 A1* | 10/2011 | Bellur | .................. | H04L 9/3273 713/158 |
| 2012/0072720 A1* | 3/2012 | Rescorla | ............... | H04L 9/3268 713/158 |
| 2012/0079596 A1* | 3/2012 | Thomas | .................. | G06F 21/55 726/24 |
| 2013/0061047 A1* | 3/2013 | Sridharan | ............. | H04L 45/586 713/162 |
| 2013/0290705 A1* | 10/2013 | Lovmand | ............ | H04L 63/0823 713/156 |
| 2013/0339953 A1* | 12/2013 | Wibling | ................ | G06F 9/5016 718/1 |
| 2014/0115675 A1* | 4/2014 | Jung | ................... | H04L 63/0853 726/6 |
| 2014/0281560 A1* | 9/2014 | Ignatchenko | .......... | G06F 21/57 713/181 |
| 2014/0380042 A1* | 12/2014 | Hanka | .................. | H04L 9/3263 713/158 |
| 2015/0058931 A1* | 2/2015 | Miu | ...................... | H04L 63/126 726/3 |
| 2015/0242330 A1* | 8/2015 | Tsirkin | ................ | G06F 12/0284 710/313 |
| 2015/0286490 A1* | 10/2015 | Chen | .................... | G06F 9/45558 718/1 |
| 2016/0188350 A1* | 6/2016 | Shah | ........................ | G09C 1/00 717/148 |
| 2016/0234019 A1* | 8/2016 | Goss | .................... | G06F 12/1408 |
| 2016/0314076 A1* | 10/2016 | Wibling | ................ | G06F 9/5016 |
| 2017/0005808 A1* | 1/2017 | Gunti | .................... | H04L 9/3268 |
| 2018/0225222 A1* | 8/2018 | Wibling | ................ | G06F 9/5016 |
| 2018/0232315 A1* | 8/2018 | Wibling | ................ | G06F 9/5016 |

* cited by examiner

METHOD AND SYSTEM FOR CHECKING REVOCATION STATUS OF DIGITAL CERTIFICATES IN A VIRTUALIZATION ENVIRONMENT

TECHNICAL FIELD

The present invention belongs to the field of computer security, and in particular, to a method and a system for checking revocation status of a digital certificate in a virtualization environment.

BACKGROUND OF THE INVENTION

Public Key Infrastructure (PKI) is based on public-key cryptography, mainly for solving the issue of key certification, that is, to whom a key pair (a private key and a public key) belongs. PKI implements key certification using digital certificates issued by Certification Authorities (CAs), which publish the owner information of key pairs, and provide security assurance to digital signature and related security services in computer networks.

CA is a third party responsible for signing digital certificates, and is an entity trusted by communication parties based on PKI. A digital certificate (or simply referred to as a certificate) binds a public key and the owner's identity of the corresponding private key by CA's digital signature (or simply referred to as signature). Using a digital certificate, PKI properly proves who owns the key pair. A digital certificate has a limited validity period. After expiration, a digital certificate is no longer valid and the binding relationship represented by the digital certificate no longer exists.

A digital certificate can be invalidated and its binding relationship terminated before its expiration due to compromises of the private key, changes of the identity information of the certificate subject (i.e., the owner of the key pair), or breaches of public key algorithms, etc. The procedure is called certificate revocation. PKI lacking certificate revocation would face significant security threats. For example, if Alice's private key is stolen by an attacker before her certificate expires, and if any certificate revocation mechanism did not exist, the attacker could impersonate Alice, login to Alice's applications and decrypt confidential information sent to Alice by others.

The basic process of publishing certificate revocation information is as follows. A CA in PKI system gathers the identifications (typically certificate serial number) of currently revoked certificates into a single list, and releases the list to all PKI users. In order to prevent counterfeiting and tampering, CA needs to digitally sign its list. This CA-signed list that contains the identities of currently revoked certificates is called Certificate Revocation List (CRL).

The basic process of using CRL to check certificate revocation status involves the following:

a. Firstly, the certificate relying party (i.e. an entity that uses someone else's certificate for encrypted communication, authentication, digital signature verification, or other security operations) can query and download CRL from PKI repository, and verify the validity of CRL itself including checking whether CRL's digital signature is correct and whether CRL is within its validity period.

b. The certificate relying party then construct a list of certificate serial numbers of revoked certificates. The list of certificate serial numbers of revoked certificates can be constructed differently for various CRL mechanisms. For basic CRL mechanism, one can obtain, from each individual CRL file, a complete list of certificate serial numbers of currently revoked certificates.

c. The certificate relying party checks whether a certificate has been revoked. The certificate relying party searches the list of certificate serial numbers of currently revoked certificates to examine if the serial number of the certificate being verified is listed therein. If it is in the list, it indicates that the certificate has been revoked; otherwise, it shows that the certificate has not been revoked.

CRL has limited timelines. Considering that certificate revocation status changes over time and is unpredictable, the information in CRL must also be subject to change in order to correctly respond to the latest situation. Notice that certificates are only to be revoked when a few security incidents occur, and in most cases a certificate will keep valid, CA generally publishes CRL reflecting the latest certificate revocation information in a periodical manner. The period of updating CRL (which implying the timelines requirement for certificate revocation information) is set by PKI system according to the security requirements of different applications of certificate relying parties. For example, the update period of CRL for large-value electronic transactions can be set as an hour, while that for daily email protection can be set as 48 hours. Certificate relying parties need to have timely accesses to CRL.

Certificate relying parties can learn about certificate revocation status of multiple certificates together from a single CRL file. This service model is suitable for situations in which certificate relying parties simultaneously communicate with many parties and thus need to verify a lot of certificates at the same time. For example, for an online game server that requires users to log in using certificates, the server only needs to periodically download the latest CRL from PKI repository, which enables it to check the revocation status of all users' certificates. It is unnecessary for the server to communicate with PKI repository each time when a certificate is being verified.

CA provides various patterns of downloading CRL such as delta CRL and redirect CRL, besides solely downloading a single CRL file. The certificate relying parties need to configure themselves separately in accordance with the CRL service patterns of different CAs. The method of downloading CRL is sometimes directly specified in a certificate as a certificate extension, which allows the certificate relying parties to automatically learn appropriate PKI repository and download CRL from that. However, the way of downloading CRL is sometimes not involved in a certificate; the certificate relying parties then need to manually configure the download methods on each individual machine, which is troublesome. Moreover, in some cases, although the method has been involved in a certificate, the specific method is not supported by the computer systems of certain certificate relying parties. For example, LDAP protocol is not universally supported by all certificate relying parties. The above described situations bring extra complexity to PKI clients designing and implementation, and confusion to application systems and users of certificate relying parties. Additionally, the certificate relying parties typically begin to download CRL after they have received certificates, the relatively large CRL files (sometimes larger than 1 M byte) can cause delay (because subsequent operations cannot get started before the CRL download is completed). Such delay can be avoided if download can occur in advance.

Virtualization technology has been widely applied since AMD and Intel have successively launched products supporting hardware virtualization. Using virtualization, enterprises can reduce cost of capital and office space requirement, and improve availability, flexibility and security of business. Virtualization technology enables users to run multiple virtual machines (referred to as VMs) on a physical computer, wherein the physical computer is called the host. An important component of the virtualization platform is the virtual machine monitor (VMM). Its main function is to manage the resources on the host and to enable the virtual machines to run on the host to share the same set of host resources. Virtualization platform provides the capability of a unified management of multiple VMs. Virtualization technology divides the VMs from the differences of lower-level implementation. The high-level VMs can take advantage of the lower-level resources in an unified manner, regardless the implementation method of the lower-level resources (which can be implemented by software or hardware, or by different types of hardware).

SUMMARY OF THE INVENTION

The present invention provides a method and a system for checking revocation status of a digital certificate in a virtualization environment. The present invention manages the accesses to Certificate Revocation List (CRL) of the certificate relying parties in each virtual machine using a certificate revocation list manager. The certificate revocation list manager runs in VMM, and is independent from the virtual machines; it serves as a virtual device to manage requests for the service of checking certificate revocation status from certificate relying parties in the virtual machines, and to provide corresponding services.

Technical aspects of the present invention is as follows:

A method for checking revocation status of digital certificates in a virtualization environment, comprising the steps of:

1) Setting up multiple virtual machines in a host computer; setting up a certificate revocation list manager within the virtual machine monitor of the host computer, wherein the certificate revocation list manager stores Certificate Revocation List (CRL) files and a configuration file of addresses to access CRL files;

2) The certificate relying parties in the virtual machines send service requests for checking revocation status of certificates to the certificate revocation list manager, wherein a service request for checking revocation status of a certificate includes: the issuer name of the certificate and the certificate serial number as an option;

3) The certificate revocation list manager searches for a local CRL file corresponding to the service request for checking revocation status of a certificate: a) If such a corresponding local CRL file exists, the certificate revocation list manager then returns the CRL file to the certificate relying party in the virtual machines, or checks whether the corresponding certificate serial number exists in the CRL file, and then returns the checking result to the certificate relying party in the virtual machines; b) if any corresponding local CRL file does not exist, the certificate revocation list manager downloads and verifies corresponding CRL file according to the configuration file mentioned above; the certificate revocation list manager then returns the downloaded CRL file to the certificate relying party in the virtual machines, or checks whether the corresponding certificate serial number exists in the CRL file, and returns the checking result to the certificate relying party in the virtual machines.

Furthermore, a service request for checking revocation status of a certificate can also include the CRL Distribution Point extension; wherein in step 3), if any corresponding local CRL file does not exist, the certificate revocation list manager firstly refers to the CRL Distribution Point extension, then downloads the CRL file from corresponding PKI repository and verifies it, then queries the revocation status information of the requested certificate and returns the result to the certificate relying party in the virtual machines.

Furthermore, after the certificate revocation list manager downloads the corresponding CRL file based on a service request for checking certificate revocation status, the certificate revocation list manager reset the update countdown (i.e. time until next scheduled downloads) of the CRL file.

Furthermore, the certificate revocation list manager periodically updates local CRL files according to the configuration file.

Furthermore, the certificate revocation manager periodically examines local CRL files, and deletes the CRL files that is not within their respective validity periods; the certificate revocation manager alternatively checks the validity periods of the corresponding CRL files when reading the CRL files to provide checking services to the certificate relying parties in the virtual machines, and re-download the latest CRL files for those who are not within their validity periods.

Furthermore, the certificate revocation list manager communicates with the virtual machines using Virtio technology, wherein the front-end driver is located in the virtual machines, the back-end driver is located within the virtual machine monitor; wherein the front-end driver and the back-end driver store operating information in a ring buffer; wherein the front-end driver and the back-end driver communicate with each other via the shared ring buffer.

Further, the virtual machine dynamically applies memory, and sends the address of applied virtual memory to the certificate revocation list manager. The certificate revocation list manager adds an offset to obtain the corresponding virtual address of the memory; the virtual machine and the certificate revocation list manager communicate through sharing the memory area.

A system for checking revocation status of digital certificates in a virtualization environment, comprising: a host computer, multiple virtual machines embodied in the host computer, and a certificate revocation list manager set within the virtual machine monitor of the host computer, wherein the certificate revocation list manager stores CRL files and a configuration file comprising the access addresses of the CRL files, wherein the certificate revocation list manager manages the service requests for the CRL files from the certificate relying parties in the virtual machines.

Furthermore, the certificate revocation manager periodically examines local CRL files, and deletes the CRL files that are not within their respective validity periods; the certificate revocation manager alternatively checks the validity periods of the CRL files when reading the corresponding CRL files to provide checking services to the certificate relying parties in the virtual machines, and re-download the latest CRL files for those who are not within their validity periods.

Furthermore, the certificate revocation list manager communicates with the virtual machines using Virtio technology, wherein the front-end driver is located in the virtual machines, the back-end driver is located within the virtual machine monitor; wherein the front-end driver and the back-end driver store operating information in a ring buffer; wherein the front-end driver and the back-end driver communicate with each other via the shared ring buffer.

The certificate revocation list manager in the present invention can be implemented in virtualization platforms based on Xen, or based on VMware ESX/ESXi, or based on Hyper-V, or based on Linux KVM-QEMU.

The present invention uses the certificate revocation list manager to provide certificate revocation status checking service to the certificate relying parties in the virtual machines in a virtualization environment. The certificate revocation list manager runs in VMM. CRL files are stored in the certificate revocation list manager. The certificate relying parties in the high-level virtual machines no longer need to directly access the corresponding PKI repositories to download CRL files; they only need to send the information of the to-be-verified certificates or request the specific CRL files via the interface provided by the revocation list manager. The certificate revocation list manager returns the corresponding certificate revocation status results or the corresponding CRL files to the certificate relying parties in the virtual machines.

The present invention provides the certificate relying parties in the virtual machines with checking service for certificate revocation status in a virtualization environment, by regarding CRL as a part of virtualized resource. From the perspective of the virtual machines, obtaining a CRL file from the certificate revocation list manager is almost as quickly as accessing to a CRL file stored in the machines locally, however in fact the CRL files are retrieved from PKI repositories by the certificate revocation list manager.

A certificate relying party in the virtual machines can choose to request the certificate revocation list manager to accomplish checking certificate revocation status. Alternatively, a certificate relying party in the virtual machines can choose to request the certificate revocation list manager to provide the needed CRL file. At this time, the certificate revocation list manager returns the CRL file to the certificate relying party in the virtual machines. After receiving the CRL file, the certificate relying party in the virtual machines checks if the to-be-verified certificate is in the CRL file.

When a certificate relying party in the virtual machines sends a request to the certificate revocation list manager for checking certificate revocation status or for a CRL file, the following information needs to be provided: the name of the certificate issuer (i.e. the Issuer field in X.509 certificate) and certificate serial number (the SerialNumber field in X.509 certificate). If the certificate includes CRL distribution point information (i.e. the CRL Distribution Points extension field in X.509 certificate), the certificate relying party in the virtual machines should also provide this information simultaneously. The certificate revocation list manager searches locally for the CRL file corresponding to the information provided by the certificate relying party in the virtual machines. If such a corresponding local CRL file exists in the manager, the revocation status of the certificate or the CRL file itself is returned to the certificate relying party in the virtual machines. If any corresponding local CRL file does not exist in the manager, the certificate revocation list manager downloads the corresponding CRL file from PKI repository based on the CRL Distribution Point information provided by the certificate relying party in the virtual machines. After the CRL file is verified, it is returned to the certificate relying party in the virtual machines; or, the certificate revocation list manager checks whether the to-be-verified certificate is revoked and returns the result to the certificate relying party in the virtual machines. If the certificate relying party in the virtual machines does not provide the CRL distribution point information, the certificate revocation list manager firstly searches for the corresponding CRL file locally in the manager using the certificate issuer's name. If such a CRL file is not found, then the certificate revocation list manager accesses the pre-configured address of the corresponding CRL file, and downloads the latest CRL file, to complete the process of checking certificate revocation status. If such an address of the corresponding CRL file is not found, then the certificate revocation list manager returns a failure message. The above-mentioned configuration can be manually set by an administrator of the certificate revocation list manager via an interface of the host computer.

Compared to the traditional programs of the certificate relying parties (when a certificate relying party in the virtual machines needs to check certificate revocation status, it directly accesses to PKI repository, downloads the latest CRL file, and checks if the certificate serial number to be queried is in CRL), the present invention has made several changes to the programs of the certificate relying parties: when a certificate relying party in the virtual machines needs to check certificate revocation status, it first selects a checking mode by selecting either the service for checking revocation status of a certificate, or the service for acquiring CRL files. Then, the software application in the certificate relying party sends the corresponding request to the certificate revocation list manager based on the selected mode and provides the necessary certificate information for the checking. The certificate revocation list manager fulfills the service request, and returns the result to the certificate relying party for further processing.

Compared with conventional technologies, the certificate revocation list manager disclosed in the present invention has the following advantages:

a. It provides the certificate relying parties in the virtual machines with service for checking certificate revocation status via a series of unified interfaces. The virtual machines do not need to simultaneously support many different network access protocols to download CRL files.

b. The CRL files are isolated from the virtual machines and are under a centralized management.

c. All the configuration of CRL mechanisms is conducted in the host computer by accessing the certificate revocation list manager via an operation interface. The above mentioned tedious configuration operations of each virtual machine user are eliminated.

In this structure, the certificate revocation list manager has the following advantages:

a. It simplifies the management of CRL mechanism configuration. The high-level virtual machines don't need to be separately configured. Only the lower-level certificate revocation list manager needs to be configured in a unified fashion for once.

b. The efficiency of checking certificate revocation status has been improved and delay reduced. Within a range (for example, all virtual desktops within an enterprise), users may communicate with a similar group of entities. The CRL files of the certificates to be verified are mostly the same; namely, the CRL files used by the certificate relying parties in multiple virtual machines running on the same host are basically the same most of the time. After the certificate revocation list manager downloads a CRL file in response to a request from a certificate relying party in the virtual machines, when other certificate relying parties in the virtual machines subsequently requests the same CRL file, the certificate revocation list manager can immediately returns the CRL file without downloading the file from PKI repository again. Meanwhile, the certificate revocation list manager can also periodically download the latest CRL files in advance, which enables more timely responses to the following requests for the CRL files from the certificate relying parties in the virtual machines. The above described measures can reduce the delay of checking certificate revocation status by the certificate relying parties in the virtual machines. Such improvement in efficiency becomes more evident when there are more users presented in the high-level virtual machines, especially suitable for enterprise-class virtual desktop systems.

DETAILED DESCRIPTION OF THE INVENTION

In order to make objects, features, and advantages of the present invention mentioned above more easily understood, the present invention is further described below based on the embodiments and the drawings.

The certificate revocation list manager in the present embodiment can be implemented in the virtualization platform based on KVM-QEMU. Its configuration interface is integrated in the QEMU console and provides ports to the administrators of the certificate revocation list manager, which allows the administrators to directly configure the certificate revocation list manager from the host computer. KVM is a Linux kernel module, and is the core of the KVM-QEMU virtualization platform. It initializes the processor, and offers a series of VMM management interfaces via ioctl system calls, including creating VM, mapping VM physical addresses, assigning virtual CPU (vCPU) to VMs, and so on. The main function of the KVM module is to capture the virtual machine's IO instructions (including Port IO and mmap IO) and to realize interruption virtualization, by operating Virtual Machine Control Structure (VMCS). QEMU process provides simulation for virtual machine platform, and can execute virtual machine's codes by calling an interface of KVM.

Figure 1:
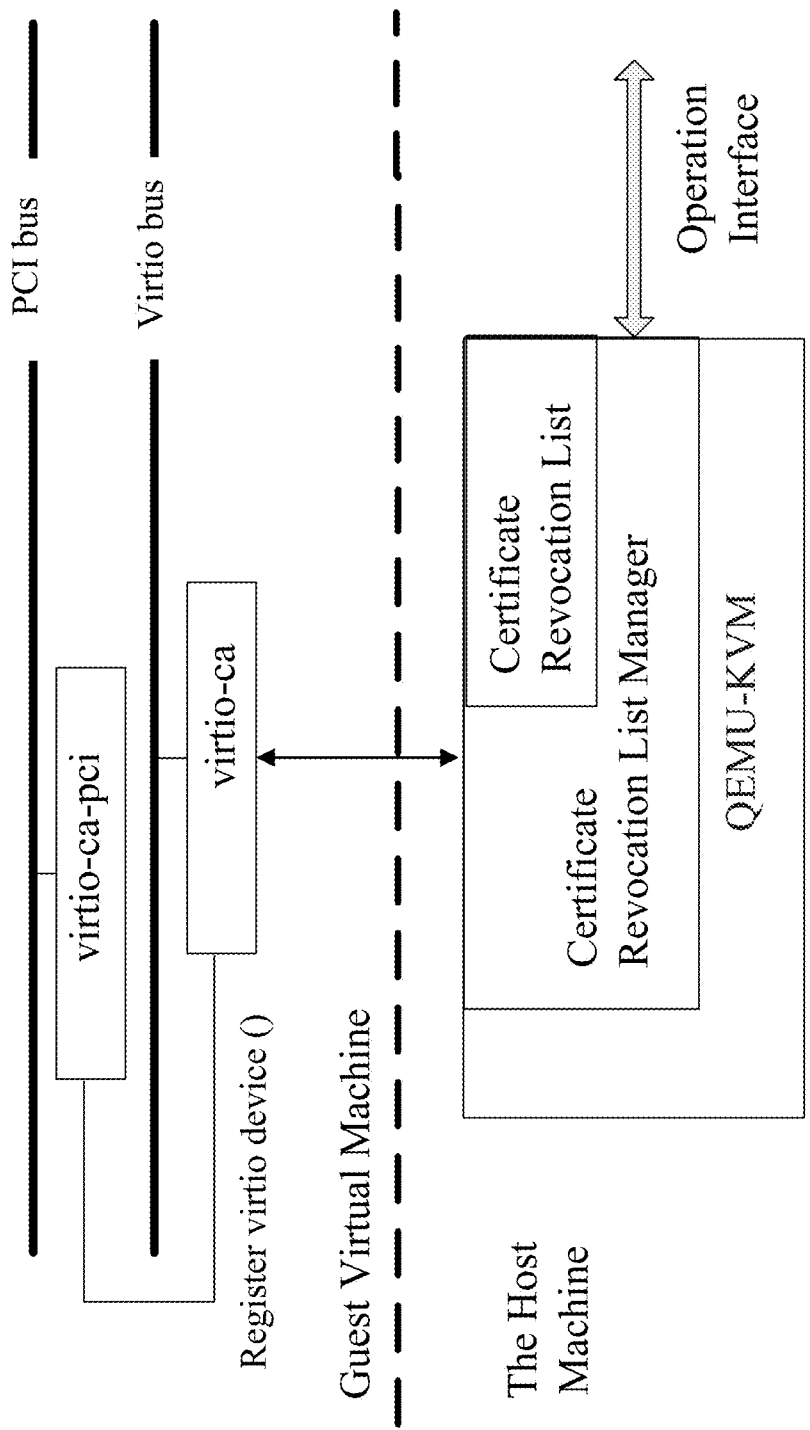
FIG. 1 is a schematic diagram for the service of examining certificate revocation status in an implementation example.

FIG. 1 is a schematic diagram illustrating the presently disclosed method for providing services for checking certificate revocation status in a virtualization environment. CRL files are stored in the certificate revocation list manager. The certificate revocation list manager runs in KVM-QEMU. The QEMU provides operation interfaces to configure the certificate revocation list manager such as setting PKI repository addresses corresponding to certificate issuers or setting CRL files' download cycles, etc. After a certificate relying party in the virtual machines submits a service request and selects a mode for checking certificate revocation status, the certificate revocation list manager responds to the request, and provides the service for checking certificate revocation status according to the mode selected by the certificate relying party of the virtual machine.

Via KVM-QEMU, the certificate revocation list manager provides a read interface to the high-level virtual machines via which the virtual machines can read CRL files, and an interface by which the virtual machines acquire services for checking certificate revocation status. The certificate revocation list manager provide corresponding services based on the requests received via the interfaces from the certificate relying parties in the virtual machines: one kind is to send the requested CRL files through the read interface to the certificate relying parties in the high-level virtual machines; the other kind is to complete certificate revocation status checking and to directly return the certificate revocation status to the certificate relying parties in the high-level virtual machines via the interface for checking certificate revocation status.

Figure 2:
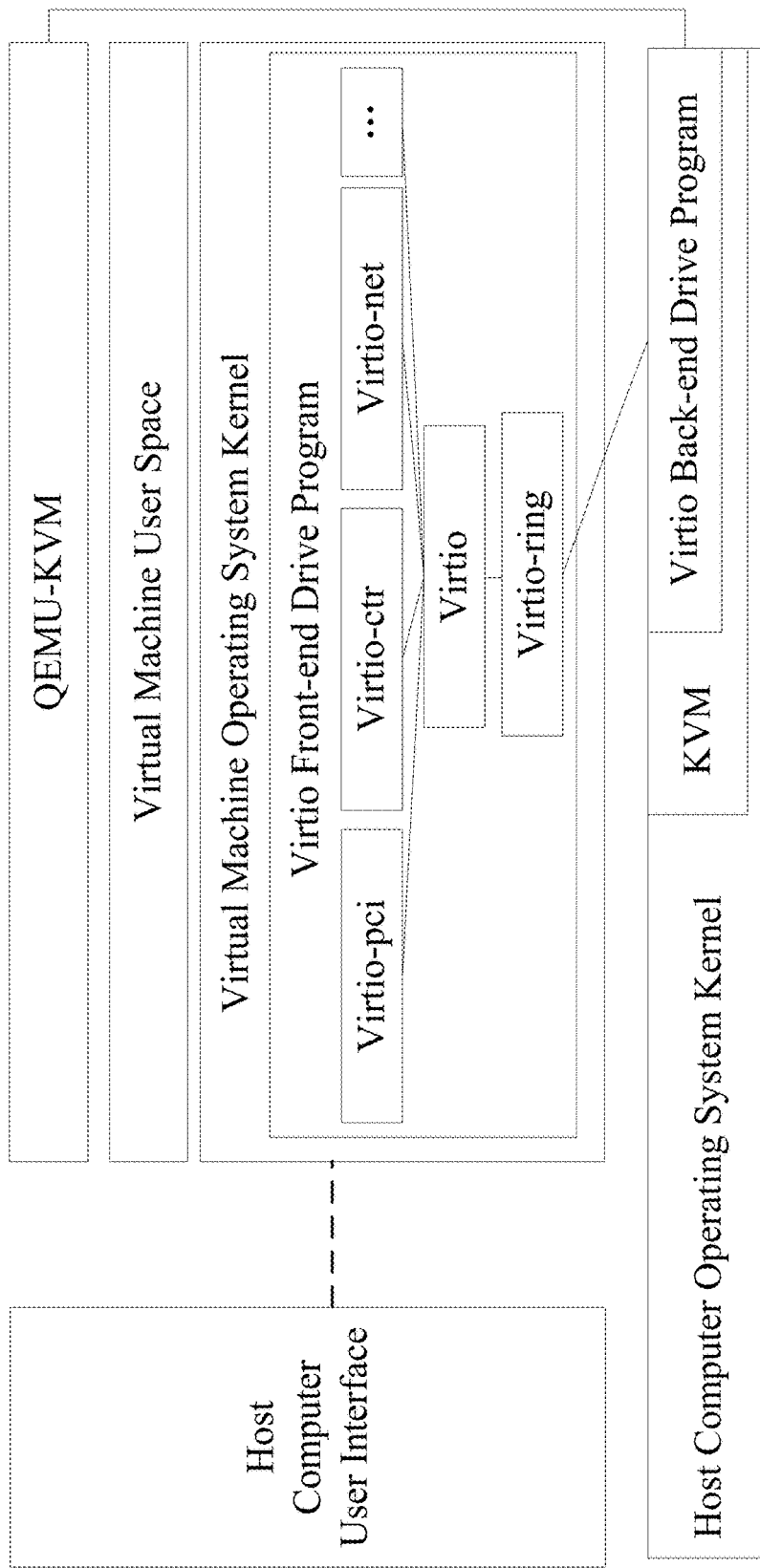
FIG. 2 is a Virtio system diagram in the implementation example.

In an embodiment, the delivering of the service requests for checking certificate revocation status between the certificate revocation list manager and the virtual machines is implemented by Virtio technology. The basic Virtio framework is shown in FIG. 2: the front-end driver (refer to as front-end, such as virtio-blk, virtio-net, etc.) is in the driver module of the virtual machines, and the back-end processing program (refer to as back-end, sometimes called back-end driver) is implemented in QEMU. In this implementation, the front-end driver is virtio-crl (a virtual certificate revocation list device), and the back-end processing program is implemented by the certificate revocation list manager, either providing the required CRL file or checking certificate revocation status and returning the verification result.

Between the front-end and the back-end, two extra layers are defined to support communication between the virtual machines and QEMU. Wherein, the virtio layer is the virtual queue (virtqueues) interface, which conceptually attaches a front-end driver to the back-end processing program. By calling virtio-ring in the lower-level, the virtual queue enables the front-end driver and the back-end processing program to send and receive data with each other using the same Application Binary Interface (ABI), thus providing a communication channel between the two sides. Therefore, the virtual queue is considered as the joint between the virtual machines and VMM. In the present embodiment, virtio-crl instantiates a pair of virtual queues (virtqueues) during initialization, to be used for delivering messages related to the service of checking certificate revocation status.

As a realization of the virtio transport mechanism, virtio_ring introduces ring buffer as the carrier of data transmission, to store the operating information of the front-end driver and the back-end processing program. It can store multiple I/O requests from the front-end driver in bulk, and sends them to the back-end driver together for batch processing. Virtqueue is a simple queue; the virtual machines insert their ring buffers into it, wherein each ring buffer is a scatter-gather array. Virtio_ring contains three parts: the descriptor table used to store some of the associated descriptors, wherein each descriptor is a description of a buffer containing an address/length pair; available ring, used to notify the virtual machines which descriptor chain is currently available; used ring, used to notify the host computer which descriptors have been used. The virtual machines use add_buf function to send requests to QEMU. The requests are formed as scatter-gather lists. The virtual machine uses the add_buf function to insert its request to the virtqueue, and to provide a scatter-gather list (including: the arrays of addresses and lengths), etc. When the virtual machine sends a request to QEMU by the add_buf function, it first adds the buffer information to the descriptor table, fills the address field and the length field, and updates the available ring head (which points to the head of the available ring list provided by the virtual machine). Finally, the virtual machine notifies QEMU about the new request with a kick function. For the best performance, the virtual machine should load the ring buffers into virtqueue as many as possible before sending the notification using the kick function. After the host computer receives the new request, it uses virtqueue_pop function to find the ring buffer inserted in available ring in the descriptor table, maps memory, reads data from the scatter-gather array, and processes the request. After the host computer completes processing, it writes the processing results into the used ring buffer. The virtual machine is triggered by the response of QEMU via get_buf function. The virtual machine can achieve polling by simply calling this function or waiting for notification via the provided virtqueue callback function. When the virtual machine knows the ring buffer is available, it calls get_buf to return used ring buffer to obtain data, releases the ring buffer, and updates the marks in ring buffer descriptor table. So far, the virtual machine and the host computer have completed a dialogue. In this embodiment, the virtual machine dynamically applies for memory and sends the physical memory address on the virtual machine to the certificate revocation list manager via PCI interface. KVM uses the kvm_memory_slot data structure to record the relationship mapping the address range of each virtual machine to that of the host computer. The data structure contains the guest frame number (GFN), the number of memory pages of the mapping, and the starting host virtual address which corresponds to this mapping area. Thus KVM can achieve conversions between the physical address on the virtual machine and virtual addresses on the host computer, by finding the mapping area using the corresponding physical address on the virtual machine, and then obtaining the corresponding host virtual address based on the offset of the virtual machine physical address in this mapping area. Thus after the certificate revocation list manager finds the corresponding mapping area, it obtains the virtual address of the memory by adding the address offset provided in the descriptor; the certificate revocation list manager and the virtual machine can communicate through the shared memory area (i.e. ring buffer).

In this example, the certificate revocation list manager is driven by virtio-crl; the latter uses a PCI interface to be recognized by the operating systems of the virtual machines. When a virtual machine mounted with the certificate revocation list manager boots up, the probe function in virtio-crl-pci driver is triggered, and registers to virtio-crl by register_virtio_driver, indicating that the certificate revocation list manager is now associated to the virtio-crl driver. At this point, virtio-crl and the certificate revocation list manager have established a communication channel. The virtual machine can use virtio-crl to send a request message to the certificate revocation list manager, and to receive the response information from the certificate revocation list manager. Virtio-crl-pci option should be added to QEMU bootup commands, to support the virtual machine to identify the certificate revocation list manager.

Before using the certificate revocation list manager, an administrator firstly needs to complete the configuration of the certificate revocation list manager, which mainly includes configuring the operating mechanism of the certificate revocation list manager in the two following situations:

a. The CRL distribution point information is provided when a certificate relying party in the virtual machines requests checking certificate revocation status:

The certificate revocation list manager first uses the information provided by the certificate relying party in the virtual machines to search if there is any corresponding CRL file locally stored. If there is a corresponding CRL file locally stored, the CRL file is used to response the request of the certificate relying party in the virtual machines, by either returning the checking results about certificate revocation status or returning the CRL file to the certificate relying party in the virtual machines.

If there is no corresponding CRL file stored in the certificate revocation list manager, the certificate revocation list manager uses the CRL distribution point information provided by the certificate relying party in the virtual machines to access to appropriate PKI repository, downloads the latest CRL file, verifies the CRL file, and responses the request of the certificate relying party in the virtual machines using the CRL file. Meanwhile, the certificate revocation list manager stores the CRL file for serving subsequent requests from the certificate relying parties in the virtual machines.

b. CRL distribution point information is not provided when a certificate relying party in the virtual machines requests checking certificate revocation status:

The administrator configures the method to obtain the CRL file of each particular certificate issuer, and stores the corresponding addresses in the certificate revocation list manager.

The certificate revocation list manager first uses the certificate issuer to search if there is a corresponding CRL file locally stored. If a corresponding CRL file exists in the certificate revocation list manager, the CRL file can be directly used; if any corresponding local CRL file does not exist, the certificate revocation list manager downloads the latest CRL file according to the address of PKI repository in the configuration file, and returns it to the virtual machines. Meanwhile, the certificate revocation list manager stores the CRL file for serving subsequent requests from the certificate relying parties in the virtual machines. If the corresponding CRL file does not exist in the certificate revocation list manager, and the access address of the corresponding PKI repository neither exists, then the certificate revocation list manager returns a failure message to the certificate relying party in the virtual machine.

An administrator also needs to configure the certificate revocation list manager for the deletion operation of the CRL files that are not within their validity period. The certificate revocation list manager can accomplish this operation in two ways: 1) the certificate revocation list manager periodically checks local CRL files and deletes the CRL files that are not within their validity periods; 2) or, when providing revocation status checking services to the certificate relying parties in the virtual machines, the certificate revocation list manager reads the corresponding CRL files stored in the manager and checks their validity. If the certificate revocation list manage discovers the files are no longer valid, it accesses to the repositories again and downloads the latest CRL files according to CRL distribution point information provided in the certificates or the CRL file access addresses in the configuration file.

The procedure of the overall interaction between a certificate relying party in the virtual machines and the certificate revocation list manager during the certificate revocation status checking service can include the following steps (divided into two modes):

a. Mode 1, the certificate relying party in the virtual machines requests the certificate revocation list manager to complete certificate revocation status checking of a certificate:

1) The certificate relying party in the virtual machines provides the information of the certificate whose revocation status is to be verified to the certificate revocation list manager through virtio-crl.

2) The certificate revocation list manager searches if there is a corresponding CRL file locally stored in the manager according to the certificate information. The information includes: the name of the certificate issuer (i.e. the Issuer field in X.509 certificate) and certificate serial number (the SerialNumber field in X.509 certificate). If the certificate includes CRL distribution point information (i.e. the CRL Distribution Points extension field in X.509 certificate), the certificate relying party in the virtual machines should provide this information as well.

3) If there is a corresponding CRL file locally stored in the certificate revocation list manager, the certificate revocation list manager checks whether the certificate serial number is in the CRL file. If it is in the file, it indicates that the certificate has been revoked; otherwise, it shows that the certificate has not been revoked. The certificate revocation list manager then returns the result back to the certificate relying party in the virtual machines, which ends this revocation status checking service of the certificate. If the certificate revocation list manager does not store the corresponding CRL file, go to step 4).

4) If there is no corresponding CRL file stored in the certificate revocation list manager, the certificate revocation list manager first uses the CRL distribution point information provided by the certificate relying party in the virtual machines or the CRL file access address set in the configuration file to access appropriate PKI repository, downloads the latest corresponding CRL file, and stores the CRL file in the certificate revocation list manager after verifying of the CRL file. Then, the certificate revocation list manager checks whether the certificate has been revoked based on the CRL file, and returns the result back to the certificate relying party in the virtual machines, which ends this revocation status checking service of the certificate.

b. Mode 2, the certificate relying party in the virtual machines requests the certificate revocation list manager to provide necessary CRL files:

1) The certificate relying party in the virtual machines sends the certificate issuer's name to the certificate revocation list manager via virtio-crl. If the CRL Distribution Point extension is included in the certificate, the certificate relying party in the virtual machines also needs to provide this information.

2) The certificate revocation list manager searches if there is a corresponding CRL file locally stored in the manager based on the information provided by the certificate relying party in the virtual machines.

3) If there is a corresponding CRL file stored in the certificate revocation list manager, the certificate revocation list manager returns the CRL file to the virtual machine, which ends this revocation status checking service of the certificate. If there is no corresponding CRL file stored in the certificate revocation list manager, go to step 4).

4) If there is no corresponding CRL file locally stored in the certificate revocation list manager, the certificate revocation list manager first uses the CRL distribution point information in the certificate or the CRL file access address in the configuration file to access appropriate PKI repository, downloads the latest CRL file, and stores the CRL file in the certificate revocation list manager after verifying the CRL file. Then, the certificate revocation list manager returns the CRL file to the certificate relying party in the virtual machines. The certificate relying party in the virtual machines completes the process of checking certificate revocation status by itself, which ends this revocation status checking service of the certificate.

In both above described modes, when the certificate revocation list manager downloads a CRL file in response to a request from a certificate relying party in the virtual machines, the certificate revocation list manager can further modify the configuration file to reset the update countdown of the CRL file. The certificate revocation list manager periodically downloads the latest CRL files according to the configuration file, enabling a more timely response next time when other certificate relying parties in the virtual machines request the CRL files, which reduces the delay when the certificate relying parties in the virtual machines check revocation status of certificates.

The foregoing description of the embodiment is provided for illustration only, rather than for the purpose of limiting, the technical solutions of the present invention. One of ordinary skill in the art may modify or vary the exemplary embodiment without departing from the spirit and scope of the present invention. The scope of the present invention should be subject to the claims.

What is claimed is:

1. A method of checking revocation status of digital certificates in a virtualization environment, comprising:
   1) setting up multiple virtual machines in a host computer; setting up a certificate revocation list manager within a virtual machine monitor of the host computer, wherein the certificate revocation list manager stores Certificate Revocation List (CRL) files and a configuration file setting access addresses of the CRL files;
   2) receiving a service request for checking revocation status of a certificate from a certificate relying party in the virtual machines by the certificate revocation list manager within the virtual machine monitor of the host computer, wherein the service request includes: the issuer name of the certificate and the certificate serial number;
   3) searching locally by the certificate revocation list manager for the CRL file corresponding to the service request:
      a) when such corresponding CRL file exists, returning the CRL file to the certificate relying party in the virtual machines; or, checking, by the certificate revocation list manager, whether the corresponding certificate serial number exists in the CRL file, and returning a result to the certificate relying party in the virtual machines indicating whether the corresponding certificate serial number exists in the CRL file; and
      b) when the corresponding CRL file does not exist, downloading and verifying the corresponding CRL file according to the configuration file; and returning the CRL file to the certificate relying party in the virtual machines; or checking, by the certificate revocation list manager, whether the corresponding certificate serial number exists in the CRL file, and returning a result to the certificate relying party in the virtual machines indicating whether the corresponding certificate serial number exists in the CRL file; and
   4) dynamically applying for a virtual memory by one of the multiple virtual machines; sending an address of the virtual memory applied by the virtual machine to the certificate revocation list manager; obtaining the address of the virtual memory, by the certificate revocation list manager, by adding an offset to the address received; and communicating through the virtual memory, as a shared memory area, by the virtual machine and the certificate revocation list manager.

2. The method of claim 1, wherein the service request for checking revocation status of the certificate further includes the CRL distribution point extension information, wherein in 3), when the corresponding CRL file does not exist, the method further comprising:
   downloading and verifying the CRL file by the certificate revocation list manager from a Public Key Infrastructure (PKI) repository based on the CRL distribution point extension information;

checking revocation status of the certificate; and returning checking result to the certificate relying party in the virtual machines.

3. The method of claim 2, wherein after the certificate revocation list manager downloads the corresponding CRL file based on the service request for checking revocation status of the certificate, the method further comprising:

resetting the update countdown of the CRL file by the certificate revocation list manager.

4. The method of claim 1, wherein the certificate revocation list manager periodically updates the local CRL files according to the configuration file.

5. The method of claim 1, further comprising:

periodically checking local CRL files by the certificate revocation manager; and deleting the CRL files that are not within their validity periods;

or checking the validity periods of the CRL files when reading the corresponding CRL files and providing checking services to the certificate relying parties in the virtual machines; and when any CRL file is not within its validity period, re-downloading the corresponding latest CRL file.

6. The method of claim 1, further comprising:

communicating with the virtual machine by the certificate revocation list manager using Virtio technology, wherein a front-end driver is located in the virtual machine and a back-end driver is located within the virtual machine monitor, wherein the front-end driver and the back-end driver store operate information in a ring buffer, wherein the front-end driver and the back-end driver communicate with each other via the shared ring buffer.

7. A system for checking revocation status of digital certificates in a virtualization environment, comprising:

a host computer equipped with multiple virtual machines;

a virtual machine monitor on the host computer, wherein the host computer is configured to set up a certificate revocation list manager within a virtual machine monitor of the host computer, wherein the certificate revocation list manager stores Certificate Revocation List (CRL) files and a configuration file that sets access addresses of the CRL files; and a certificate revocation list manager in the virtual machine monitor configured to receive a service request for checking revocation status of a certificate from a certificate relying party in the virtual machines, wherein the service request includes the issuer name of the certificate and the certificate serial number, wherein the certificate revocation list manager is configured to search locally for the CRL file corresponding to the service request according to the following steps:

a) when such corresponding CRL file exists, the certificate revocation list manager returns the CRL file to the certificate relying party in the virtual machines; or, the certificate revocation list manager checks whether the corresponding certificate serial number exists in the CRL file, and returns a result to the certificate relying party in the virtual machines indicating whether the corresponding certificate serial number exists in the CRL file; and b) when the corresponding CRL file does not exist, the corresponding CRL file is downloaded and verified according to the configuration file; and the certificate revocation list manager returns the CRL file to the certificate relying party in the virtual machines; or the certificate revocation list manager checks whether the corresponding certificate serial number exists in the CRL file, and the certificate revocation list manager returns a result to the certificate relying party in the virtual machines indicating whether the corresponding certificate serial number exists in the CRL file, wherein one of the multiple virtual machines is configured to dynamically apply for a virtual memory and send an address of the virtual memory to the certificate revocation list manager, wherein the certificate revocation list manager is configured to obtain the address of the virtual memory by adding an offset to the address received, wherein the virtual machine and the certificate revocation list manager are configured to communicate through the virtual memory as a shared memory area.

8. The system of claim 7, wherein the service request for checking revocation status of the certificate further includes the CRL distribution point extension information, wherein when the corresponding CRL file does not exist, the certificate revocation list manager is configured to download and verify the CRL file from a PKI repository based on the CRL distribution point extension information, to check revocation status of the certificate and to return checking result to the certificate relying party in the virtual machines.

9. The system of claim 8, wherein after the certificate revocation list manager is configured to reset the update countdown of the CRL file after downloading the corresponding CRL file based on the service request for checking revocation status of the certificate.

10. The system of claim 7, wherein the certificate revocation list manager is configured to periodically update the local CRL files according to the configuration file.

* * * * *